(12) United States Patent
Cohen-Zada

(10) Patent No.: US 11,761,538 B2
(45) Date of Patent: Sep. 19, 2023

(54) SEALING SYSTEM FOR ROTARY SHAFT

(71) Applicant: Tamar (R.C.) Technologies Development Ltd., Omer (IL)

(72) Inventor: Vaitzman Cohen-Zada, Beer-sheva (IL)

(73) Assignee: Tamar (R.C.) Technologies Development Ltd., Omer (IL)

(*) Notice: Subject to any disclaimer, the term of this patent is extended or adjusted under 35 U.S.C. 154(b) by 501 days.

(21) Appl. No.: 16/783,359

(22) Filed: Feb. 6, 2020

(65) Prior Publication Data

US 2021/0246983 A1    Aug. 12, 2021

(51) Int. Cl.
  *F16J 15/18*      (2006.01)
  *F16J 15/00*      (2006.01)
  *F16J 15/3272*    (2016.01)
  *F16J 15/16*      (2006.01)
  *F16J 15/324*     (2016.01)

(52) U.S. Cl.
  CPC .......... *F16J 15/182* (2013.01); *F16J 15/006* (2013.01); *F16J 15/164* (2013.01); *F16J 15/324* (2013.01); *F16J 15/3272* (2013.01)

(58) Field of Classification Search
  CPC ........ F16J 15/182; F16J 15/006; F16J 15/164; F16J 15/324; F16J 15/3272
  See application file for complete search history.

(56) References Cited

U.S. PATENT DOCUMENTS

| | | | | |
|---|---|---|---|---|
| 3,067,763 A | * | 12/1962 | Bredtschneider | F16K 5/222 137/246.22 |
| 3,124,502 A | * | 3/1964 | Radke | F16J 15/20 428/378 |
| 3,628,798 A | * | 12/1971 | Mehlhope | F16J 15/24 277/583 |
| 3,876,213 A | * | 4/1975 | Miliczky | F16J 15/181 277/627 |
| 4,087,097 A | * | 5/1978 | Bossens | F16J 15/342 277/927 |
| 4,899,899 A | * | 2/1990 | Junier | F16J 15/183 220/581 |
| 5,372,352 A | * | 12/1994 | Smith | F16K 41/046 251/312 |
| 5,375,853 A | * | 12/1994 | Wasser | F16J 15/3404 277/408 |

(Continued)

*Primary Examiner* — Eugene G Byrd
*Assistant Examiner* — L. Susmitha Koneru
(74) *Attorney, Agent, or Firm* — Robert G. Lev

(57) ABSTRACT

A sealing unit for a drive shaft driving a working fluid; the sealing unit comprising a sleeve attached to the drive shaft and a gland attached to the housing, a static seal ring attached to the gland and in close proximity to the sleeve, and a stuffing box about the static seal ring, fibrous packing seal blocking the distal and proximal ends of the stuffing box and a first sealant comprising a viscous, non-Newtonian fluid that is injected into the stuffing box under a first pressure exceeding the pressure of the working fluid; the sealing unit further comprising an inner fluid seal of a Newtonian fluid between the first sealant and the drive shaft upstream of the first sealant, such that the Newtonian fluid seal is kept at a pressure slightly higher than the pressure of the working fluid and prevents the working fluid from reaching the first sealant.

14 Claims, 7 Drawing Sheets

(56) References Cited

U.S. PATENT DOCUMENTS

| | | | | |
|---|---|---|---|---|
| 5,427,500 | A * | 6/1995 | Hyll | F04D 29/128 |
| | | | | 277/432 |
| 5,529,315 | A * | 6/1996 | Borrino | F16J 15/004 |
| | | | | 277/927 |
| 10,737,890 | B2 * | 8/2020 | Mallaley | F16J 15/164 |
| 2009/0039108 | A1 * | 2/2009 | Cohen-Zada | F16J 15/181 |
| | | | | 277/512 |
| 2009/0194949 | A1 * | 8/2009 | Cohen Zada Vaizman | |
| | | | | F01C 19/10 |
| | | | | 277/357 |
| 2011/0074115 | A1 * | 3/2011 | Cohen Zada Vaizman | |
| | | | | F16J 15/181 |
| | | | | 277/513 |
| 2011/0298183 | A1 * | 12/2011 | Lindner-Silwester | |
| | | | | F16J 15/406 |
| | | | | 277/500 |
| 2014/0232069 | A1 * | 8/2014 | Jacobs | F16J 15/3448 |
| | | | | 277/365 |

* cited by examiner

Working fluid in housing

SEALING SYSTEM FOR ROTARY SHAFT

BACKGROUND OF THE INVENTION

The present invention relates to the field of seals. More particularly, the invention relates to sealing systems for rotary shafts that include viscous sealants.

Many types of heavy rotary machinery, such as pumps, compressors and turbines, produce work by means of a working fluid enclosed within a working chamber or apply work to such a fluid. Such equipment is generally characterized by a main shaft that rotates with respect to a housing. Part of the shaft is coupled to the working fluid and part of the shaft protrudes from the housing.

At the aperture where the shaft exits the housing, there is a tendency for the working fluid to leak. To at least minimize, or better, to eliminate this leakage, the clearance between shaft and aperture perimeter is kept small and a seal is applied around the shaft and aperture. The seal is required to allow the shaft to rotate with minimal inhibition thereof, whilst blocking the space between the shaft and the aperture.

Numerous seal types are known. For low speed rotary machines, spring loaded gaskets, such as O-rings may be adequate. For high speed rotary machines, one common seal type is the mechanical seal which consists of radial planar surfaces normal to the shaft axis that are machined to low surface roughness. One surface is gasketed to the housing while a second surface is driven by the shaft and sealed thereon by a secondary seal such as a bellows or an O-ring against the plane that having no relative movement therewith. Springs and or the fluid pressure of the working fluid are usually used to apply a compression force between the rotary and stationary faces. Mechanical seals of this type are generally expensive. They also have a tendency to fail catastrophically without warning. Furthermore, the repair of a faulty mechanical seal is costly and time consuming, since it generally necessitates extensive rotary machine downtime. Moreover, using a mechanical seal in slurry processes where the particulate solids content exceeds 30% is almost impossible due to wear to the seal faces.

Another type of high speed rotary machine seal is the compression braided packing seal. This type of seal includes a braided rope that is wrapped around the shaft. Working fluid leaking from the housing keeps the rope moist and swells the fibers thereof. The working fluid prevents the rope from overheating and catching fire or plastically deforming. Consequently, such seals cannot work dry and their operation requires controlled leakage. The packing seals have a tendency to abrade the shaft surface, particularly during tightening and adjustment procedures. As the rope packing slowly loosens, it noticeably leaks, thereby provides early indication that maintenance is required, allowing the seal to be tightened. The rope packing material erodes relatively quickly due to friction and needs to be replaced, often by time-consuming replacement procedures. It will be appreciated that any maintenance that is required periodically, such as once a week, typically requires equipment shutdown.

Where the working fluid is hazardous, the compression packing seal is inappropriate since it works by controlled leakage. In various chemical industries leakage has to be completely avoided.

To ensure tight fitting between the shaft and the solid seals, whether 'O' rings, rope seals, or other types of gaskets, the drive shaft must be cylindrical and accurately machined to a high surface finish. Pits and other irregularities result in leakage. This makes such seals unsuitable where the working fluid is a slurry, since the particles of the slurry cause abrasion to the mating surfaces.

Where the working fluid is a corrosive slurry, pit corrosion can cause failure.

One leak-free sealing technique uses a viscous, non-Newtonian fluid that is injected under pressure into the stuffing box surrounding the drive shaft. Seals of this type are designed to prevent the working fluid from leaking from the working chamber through the space between the rotary shaft and the perimeter of the aperture through which the shaft exits the housing. The viscous sealant material may be bounded by one or more 'O' rings or rope seals at each end of the stuffing box, which serve to keep the sealant in place, and, because of their generally springy nature, tend to work with the fluid sealant to provide a theoretically leak-free seal. Although such seals will not leak immediately after manually injecting sealant, in practice, such seals actually do leak, since the sealant behaves like packing as it becomes loose in time.

By maintaining the pressure of the sealant within the stuffing box above the pressure of the working fluid in the working chamber, the sealant is pushed against the shaft, trapping the working fluid within the working chamber.

The pressure in the stuffing box is required to be sufficiently high to promote adhesion of the sealant onto the rotary shaft, and to retard leakage of working fluid from the working chamber into the stuffing box through the shaft aperture. The sealant pressure may generally be slightly less than the working fluid chamber due to the contribution of the surface tension of the sealant adhering to the shaft, which retards the infiltration of working fluid to the stuffing box. Leakage may be noticeable, however, if the pressure differential between the working chamber and stuffing box is greater than a threshold level such that the pressure-derived force acting on the shaft openings penetrates the sealant that adhered to the shaft.

As the sealant pressure is increased, the 'lost work', or work expended as a result of the frictional forces between the rotating shaft and the sealant correspondingly increases. This lost work is directly proportional to the product of the shaft diameter, rotational speed of the shaft, and the frictional forces between the shaft and the sealant that is adhered to the wall of the corresponding shaft opening. Since the frictional forces between the shaft and the sealant are directly proportional to the sealant pressure, it follows that the lost work is also directly proportional to the sealant pressure.

An increase in lost work is undesirable since the overall efficiency of the rotary machine decreases as more work is lost. Furthermore, the lost work is dissipated in the form of heat energy, which causes the temperature of the sealant in the vicinity of a shaft opening to increase. When the sealant temperature exceeds a recommended maximum temperature, a risk of sealant flammability exists, and additionally, the rate of heat transfer from the sealant to the working fluid is such that local boiling and cavitation within the working fluid is liable to result, particularly when the working fluid contains water.

In general, therefore, as the pressure of the sealant within the stuffing box is increased, more work is required to turn the shaft and the efficiency of the system is adversely affected. However, the frictional forces between the rotating shaft and the surrounding sealant erode the adhered sealant, reducing the pressure of the sealant within the stuffing box, and if the pressure drops below the pressure of the working fluid, the working fluid will leak along the drive shaft. The optimal pressure at which the sealant is maintained is typically established empirically.

Such sealants are generally introduced into the stuffing box under pressure by an appropriate injection device through an aperture that can be sealed thereafter. Periodically, additional sealant needs to be introduced to the stuffing box to maintain the sealant pressure at a desired level. Generally the addition of such sealant and the operating pressure thereof are not optimal in that when the seal noticeably leaks, indicating too low a pressure, additional sealant is added, resulting in over-compensating generally resulting in too high a pressure. This issue is addressed in WO07099535A2 titled "Apparatus for delivering sealant at a predetermined pressure to a stuffing box of a shaft" in which the sealant pressure is maintained at a desired level by keeping a sealant injector coupled to the system at all times to inject fresh sealant as required to maintain a desired pressure.

To prevent the sealant overheating, water cooling may be used, with water introduced into a jacket surrounding the seal.

However, it will be appreciated that typically, in addition to the desired rotation about their axes, drive shafts of real systems tend to vibrate as well. It has been found that such vibrations break the adhesion between the drive shaft and sealant, causing cavities to form along the drive shaft which results in leakage of the working fluid.

This is particularly problematic when pumping slurries as the abrasive particles in the slurry causes increased wear.

All mechanical seals require periodic maintenance although improvements may increase the time required between maintenance sessions. Generally maintenance requires stopping the machine and disassembly. In addition to the technician costs and the cost of replacement parts, if necessary, significant costs may be incurred in stopping the machine and disconnecting the drive shaft to remove the seal for maintenance.

SUMMARY OF THE INVENTION

It will be appreciated that seals to stop leaks between static parts is relatively easy with O rings, washers and the like. Where a moving part exits a static housing and it is necessary to seal between the two, it is much more difficult. Conventional mechanical seals do have controlled leakage. In fact, it is the working fluid that lubricates the mating surfaces of the mechanical seal and which stops braided packing seals from drying out. Without controlled leakage, the seal would fail!However, for highly corrosive or environmentally problematic working fluids, any leakage is problematic. Mechanical seals with high viscosity non-Newtonian sealants within the stuffing box can sometimes be used for these applications, but there is still a danger of leakage. Where the working fluid is a slurry with abrasive particulates, such seals are ineffective.

A feature of embodiments of the invention is directed to an improved seal that is suitable for sealing rotating shafts used to pump challenging working fluids such as corrosive liquids abrasive slurries, and corrosive abrasive slurries.

A further feature is directed to a mechanical seal with no leakage.

A further feature is directed to low maintenance, long term reliability.

Yet a further feature of preferred embodiments is directed to a mechanical seal that can be opened in situ to allow cleaning and maintenance with minimal downtime.

An aspect of the invention is directed to a sealing unit for a drive shaft driving a working fluid;

the sealing unit comprising a sleeve attached to the drive shaft and a gland attached to the housing, a static seal ring attached to the gland and in close proximity to the sleeve, and a stuffing box about the static seal ring, fibrous o-rings blocking the distal and proximal ends of the stuffing box and a first sealant comprising a viscous, non-Newtonian fluid that is injected into the stuffing box under a first pressure exceeding the pressure of the working fluid;

the sealing unit further comprising an inner fluid seal of a Newtonian fluid between the first sealant and the drive shaft upstream of the first sealant, such that the Newtonian fluid seal is kept at a pressure slightly higher than the pressure of the working fluid and prevents the working fluid from reaching the first sealant.

Typically the first sealant is introduced into the stuffing box by a pressure injector thereby ensuring that the pressure thereof is above that of the pressure of the working fluid.

Preferably washers are provided between the first sealant and the packing seals for distributing pressure of the first sealant more evenly across the o-ring.

Optionally the washers have holes therethrough or perimeter cut outs, to facilitate contact between the first sealant and the packing seals.

In some embodiments, the sealing unit comprises an external jacket around the stuffing box of the first sealant separated from the stuffing box by a space and water is injected into the space to cool the stuffing box and the first sealant therein.

Typically the packing seals are fibrous o-rings, or braided packing seals.

Typically the Newtonian fluid is a gas.

Most typically the Newtonian fluid is air, but may be a passive gas such as nitrogen.

Optionally the Newtonian fluid of the inner seal is a liquid such as water.

Typically the Newtonian fluid is kept at a pressure slightly higher than the working fluid so that it leaks into the working fluid preventing leakage of the working fluid into the sealing unit.

Preferably the injection of the first sealant is asymmetric to the drive shaft.

Typically the sealing unit comprises a proximal housing and a distal ring lid that closes the housing, and the distal ring lid is a split ring comprising two hemi-cylindrical sections that may be disconnected from the proximal housing and pulled apart to allow access to the housing without dismantling the housing from the drive shaft.

Optionally the housing comprises pairs of elements with hemi-cylindrical inner surfaces that are coupled together about the drive shaft, so that the that sealing unit may be attached to a drive shaft in situ without threading onto the drive shaft.

The term working fluid refers to the fluid being pumped.

BRIEF DESCRIPTION OF THE DRAWINGS

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings.

DESCRIPTION OF EMBODIMENTS

Figure 1:
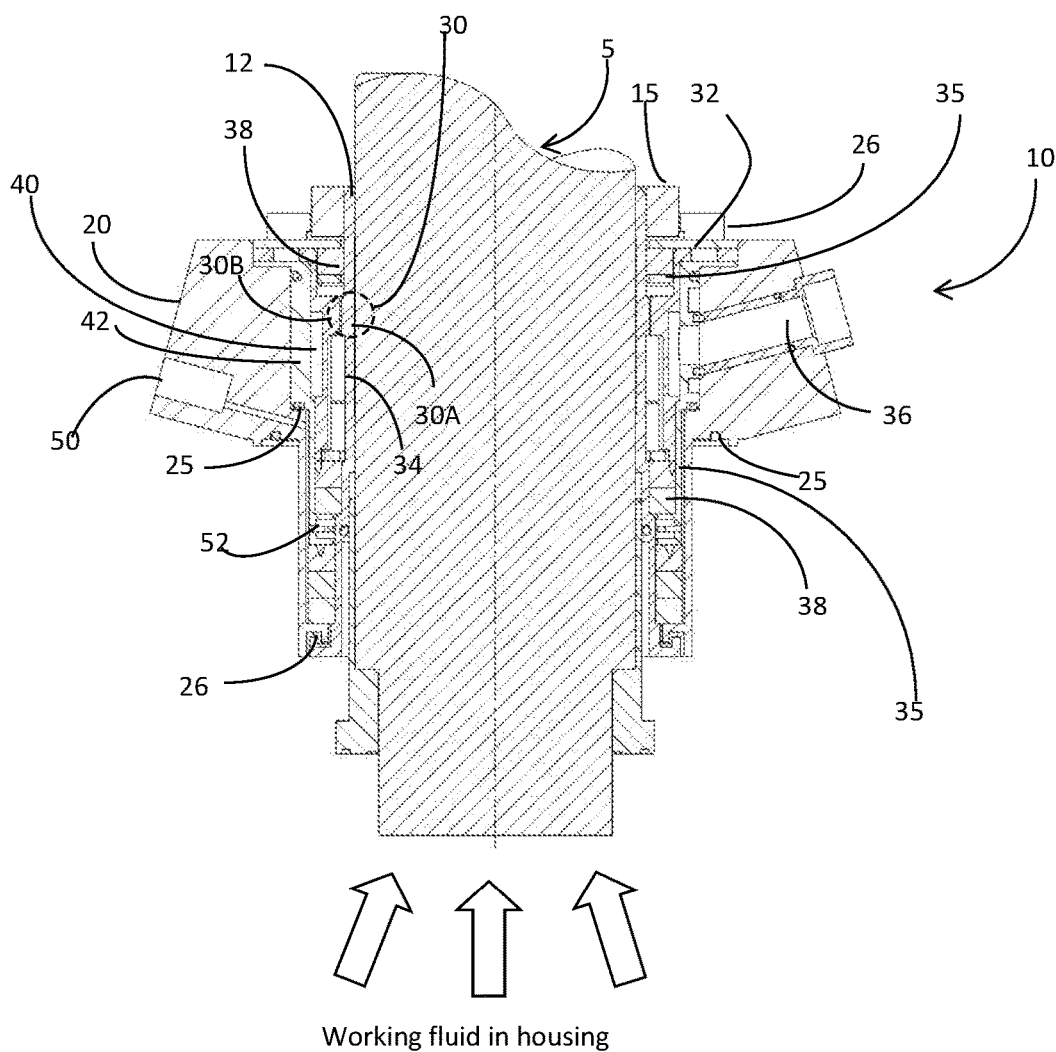
FIG. 1 is schematic sectional view of the sealing unit of one embodiment of the invention.

In the forgoing description, the side of the sealing unit closest to the working fluid is referred to as upstream or proximal, and the side furthest away is referred to as downstream or distal.

With reference to FIGS. 1-4 in accordance with a first embodiment, there is shown a section through a sealing unit 10 for sealing the opening of the housing (not shown) from which a rotating drive shaft 5 protrudes.

This type of sealing unit is appropriate for rotary pumps and other low speed equipment.

Until now, seals for pumps have not used injected air to keep the working fluid away from the sealing rings, presumably due to cavitation which typically causes enhanced wear. It has, however, been surprisingly found that the arrangement described in embodiments of the seal described herein is based on the injecting of small amounts of air from downstream of the pump, and has been found not to cause cavitation wear, allowing long term, low maintenance usage.

The sealing unit 10 comprises a drive shaft sleeve 12 that is sealingly attached to the drive shaft 5 of the pump or other equipment by O rings 14 that prevent leakage of the working fluid between the drive shaft 5 and the sleeve 12.

A gland 20 is coupled to the opening of the housing. The gland 20 surrounds a divider 32, which is a fixed element of the sealing keeps the sealant from rotating with the drive shaft 5, and makes sure it stays stationary to allow proper functioning of the seal.

A collar 15 is attached to the sleeve 12 and thus rotates with the drive shaft 5. It covers the stuffing box 16 of the sealing unit 10 and holds everything within the gland 20.

A mechanical seal 30 is provided between tightly a rotating male internal ring 30A integral to and extending radially from the sleeve 12 and a corresponding external stationary female ring 30B which is fixed to the casing 32 and is generally an integral part of the casing 32. The space between the casing 32 and the sleeve is known as the stuffing box 34 and is filled with a non-Newtonian viscous sealant that may be introduced into the stuffing box 34 by port 36.

The viscosity of the non-Newtonian viscous sealant varies as a function of the shear stress applied thereto. Typically such sealants are fabricated from a blend of synthetic fibers, lubricants and binding agents.

U-PAK® manufactured by UTEX industries is an example of such a sealant.

The non-Newtonian viscous sealant may be provided as a cartridge that is connectable to port 36 and is introduced under pressure into the stuffing box 34. The surface tension of the non-Newtonian viscous sealant plus its pressure must slightly exceed the pressure of the working fluid.

Packing rings 38 that are typically Kevlar®, graphite and Teflon® fibrous o-rings of braided seal material provide a tight clearance against the shaft sleeve, retaining the flexible sealant within the stuffing box 34.

It is believed that leakage typically occurs on the side of the seal opposite to that where the viscous sealant is injected and the viscous sealant, being a non-Newtonian fluid, does not transmit pressure evenly and so away from the injection point, the pressure is lower and leakage is thus most likely along the far side of the drive shaft 5 from the sealant injection port 36. It is a feature of preferred embodiments of the invention, that washers 35 are provided between adjacent to the packing rings 38, between the viscous sealant and the packing rings 38. The washers 35 are flat rings that are typically fabricated from stainless steel and help distribute the pressure of the injected non-Newtonian viscous sealant more evenly across the sealing unit. The washers 35 have holes therethrough, or ut out sections along the perimeters thereof, so that the non-Newtonian viscous sealant contacts and lubricates the packing rings 38. When incorporating such washers 35, because of the better distribution of the pressure of the non-Newtonian viscous sealant around the drive-shaft 5, that working fluids at a higher pressure can be pumped without leakage. In fact, it has been surprisingly found that working pressures of 30% higher can be pumped without fear of leakage when incorporating such washers 25 between the packing rings 38 and the non-Newtonian sealant.

Systems designed for low shaft speeds, with shaft peripheral velocity that is less than about 0.5 meters second (1.64 feet/second) as typically used on blenders, mixers or progressing cavity pumps, typically do not require cooling. Furthermore, in typical working conditions for a pump, the air injection through the seal also cools the shaft sleeve.

Figure 2:
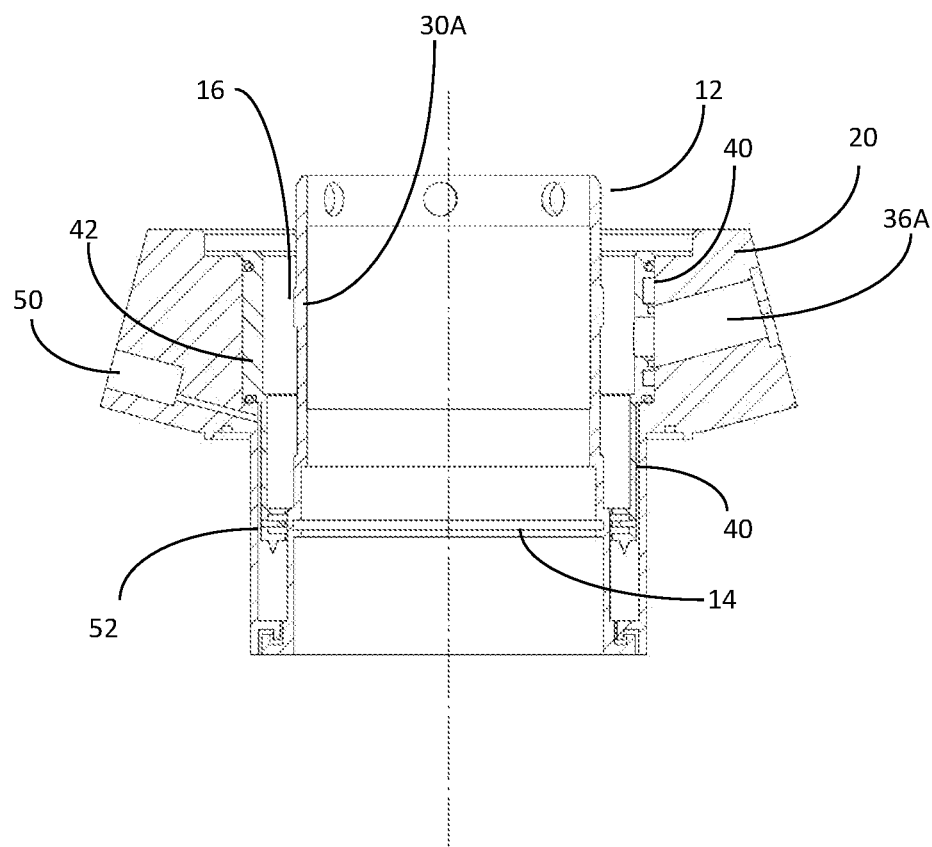
FIG. 2 shows the gland, shaft sleeve, stuffing box without the mating (female—static) mechanical seal ring that engages the (male) mechanical seal ring on the drive-shaft sleeve.
Figure 3:
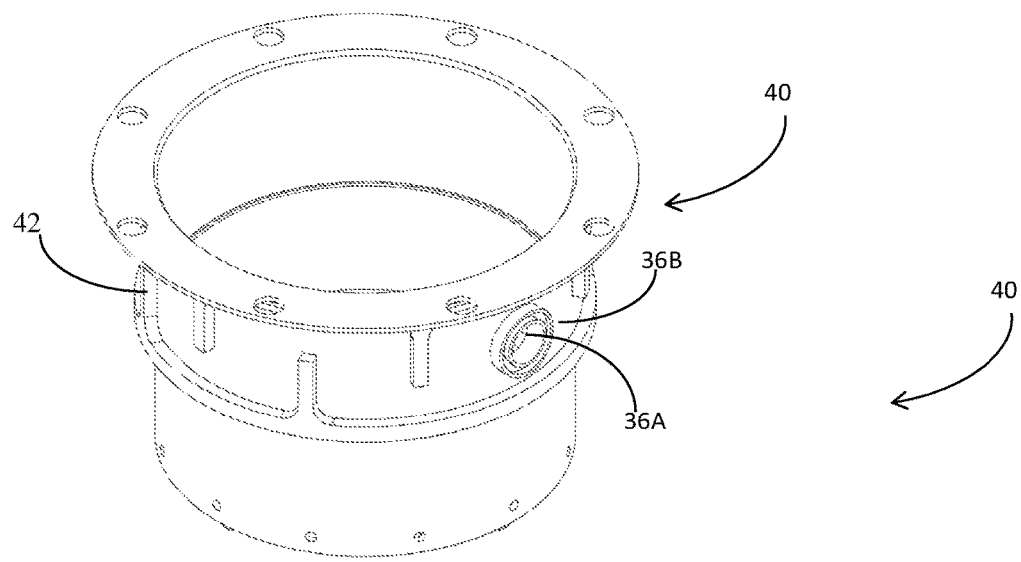
FIG. 3 is an isometric projection of the water cooling jacket on the outside of what becomes the outer wall of the stuffing box.
Figure 4:
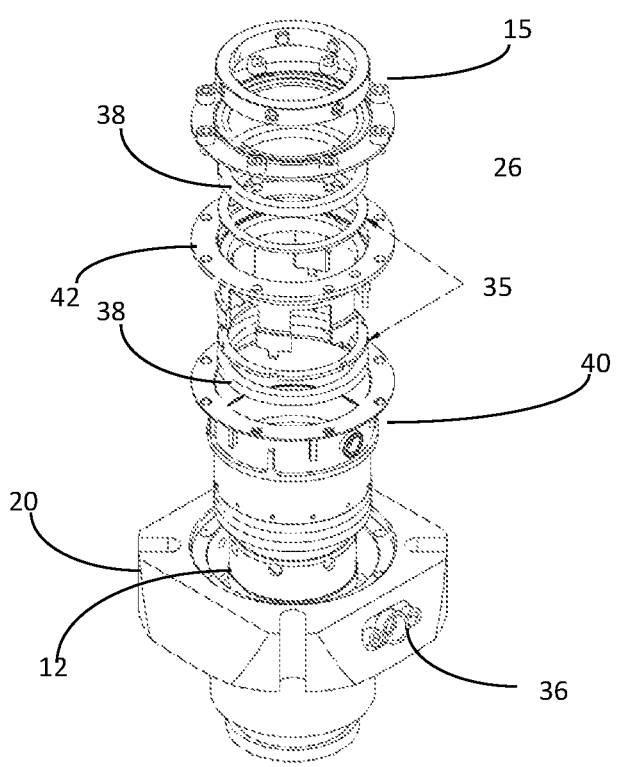
FIG. 4 is an exploded view of the seal of the embodiment of FIG. 1, showing how the various components are stacked.

Higher shaft peripheral speeds, such as those of most centrifugal pumps, may require cooling of the seal unit. An illustration of the cooled assembly as used in centrifugal pumps is shown in FIGS. 1, 2 and 3.

Cooling is, also required in systems where the working fluid is hot.

In some embodiments, to prevent overheating of the non-Newtonian viscous sealant, where cooling is required, a water cooled jacket 40 surrounding the stuffing box 34 is provided.

a cooling chamber is formed between the external jacket 40 of the sealant chamber 34 and the gland 20, and the cooling medium does not contact the working fluid or the sealant. Guide vanes 42 in the cooling chamber, that extend alternately from a proximal dividing ring and from the distal flange, distribute the flow from the in/out ports in a serpentine path.

FIG. 2 shows the cooling jacket 40 within the gland 20, and FIG. 3 is an isometric projection of the cooling jacket showing the port 36 where the non-Newtonian viscous sealant 35 may be introduced through the cooling jacket into the stuffing box. Guide vanes 42 extend radially from the cooling jacket, between the cooling jacket 40 and the gland 20, extending alternatively from the proximal divider ring 43 and the distal flange of the external side of the jacket so that cooling fluid, typically water, follows a snaking path to maximize contact with the outside of the external jacket 40 as it flows from the water entrance port to the water exit port to maximize the cooling effect.

Thus far, apart from the washers 25 disclosed herein, the sealing unit as described is similar to prior art sealing units such as those described in US 2009/194,949 and in US 2009/194,951 both to the present applicants.

The injectable non-Newtonian viscous sealant fills the internal cavity 34 of the sealing unit, and a patented constant air powered booster may be utilized to maintain a continuative compression on the sealant 24/7 with a cartridge of a reserve stock of sealant is located to feed the internal seal. Small losses of sealant occurs, and the booster with an indicator rod will feed new sealant. Since such losses are minimal and are not internal to the process fluid, the sealing system described herein applicable to food grade services. It will also be noted that replacement of the viscous sealant in the feed tube is easily accomplished while the pump is running.

Such sealing solutions prevent leakage of the working fluid, by leakage or evaporation of the non-Newtonian viscous sealant. They are suitable for a wide range of applications.

However, as explained hereinabove, for hazardous working fluids, such a sealing unit may be insufficient. Particularly when pumping slurries which contain tiny abrasive elements in suspension, such sealing units are inappropriate. The packing rings 38 can fail and the particles of the slurry get incorporated in the sealant and cause wear of the mating surfaces of the mechanical seal.

Thus in some embodiments of the invention, upstream of the mechanical seal of the non-Newtonian viscous sealant type described above, and in series therewith, between the working fluid and the mechanical seal of the non-Newtonian viscous sealant type, a second sealing feature consisting of a fluid pressure seal 52 may be provided. This is typically a gas and may be air pumped in under pressure via the port 50, or may be an inert gas such as nitrogen, or argon where required to prevent adverse chemical reactions or fire.

Thus a feature of sealing units 10 of the invention is that contrary to conventional seals, the working fluid does not contact the mating surfaces 30A, 30B of the mechanical seal, or the non-Newtonian viscous sealant 35 and does not get anywhere near to the mating surfaces 30A, 30B of the mechanical seal 30. This design allows the system to run dry, to work in high abrasive slurries, and to withstand gross axial and redial misalignment.

The pressure of the fluid pressure seal 52 is required to exceed that of the working fluid but will typically not exceed the combined surface tension and pressure of the injectable non-Newtonian viscous sealant.

The fluid pressure seal keeps the working fluid totally separate from the injectable non-Newtonian viscous sealant. Typically the fluid pressure seal is an air seal. The air duct for providing compressed air to the air seal has a decreasing size towards the shaft sleeve to ensure that a high pressure than that of the working fluid is maintained.

Rings 25 for sealing between the jacket 40 and the gland 20 and the O ring 14 for sealing between the sleeve 12 and the drive shaft 5 seal mutually static components and may be simple rubber or polymer O rings.

PTFE (Teflon®) spacers 26 may be used to separate the gland 20 and the shaft sleeve 12.

Figure 5:
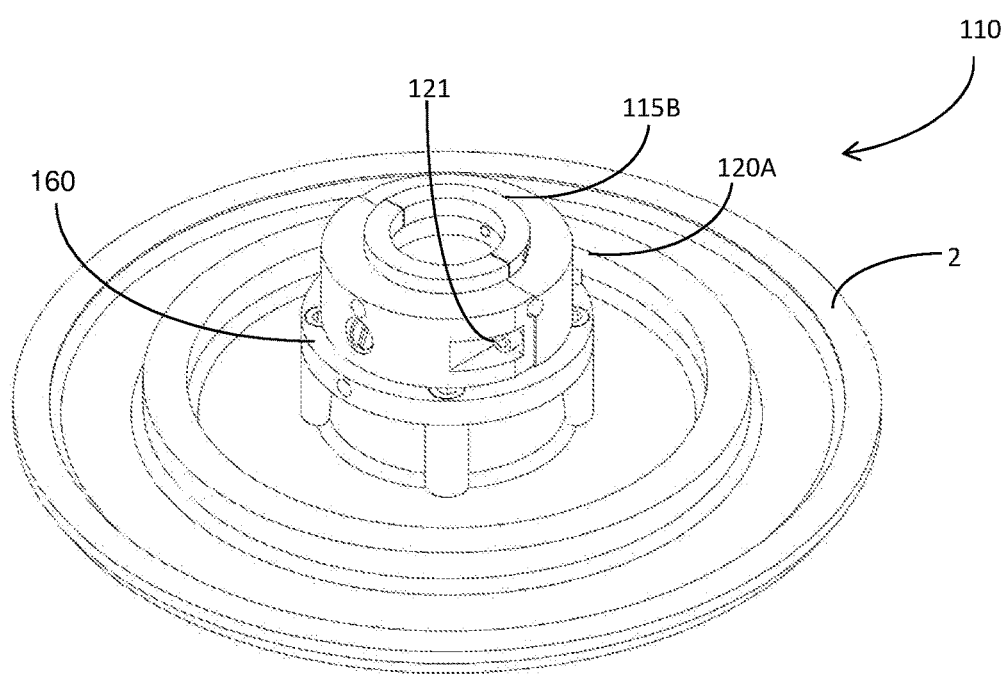
FIG. 5 an isometric projection of a sealing unit in accordance with a second embodiment.
Figure 6:
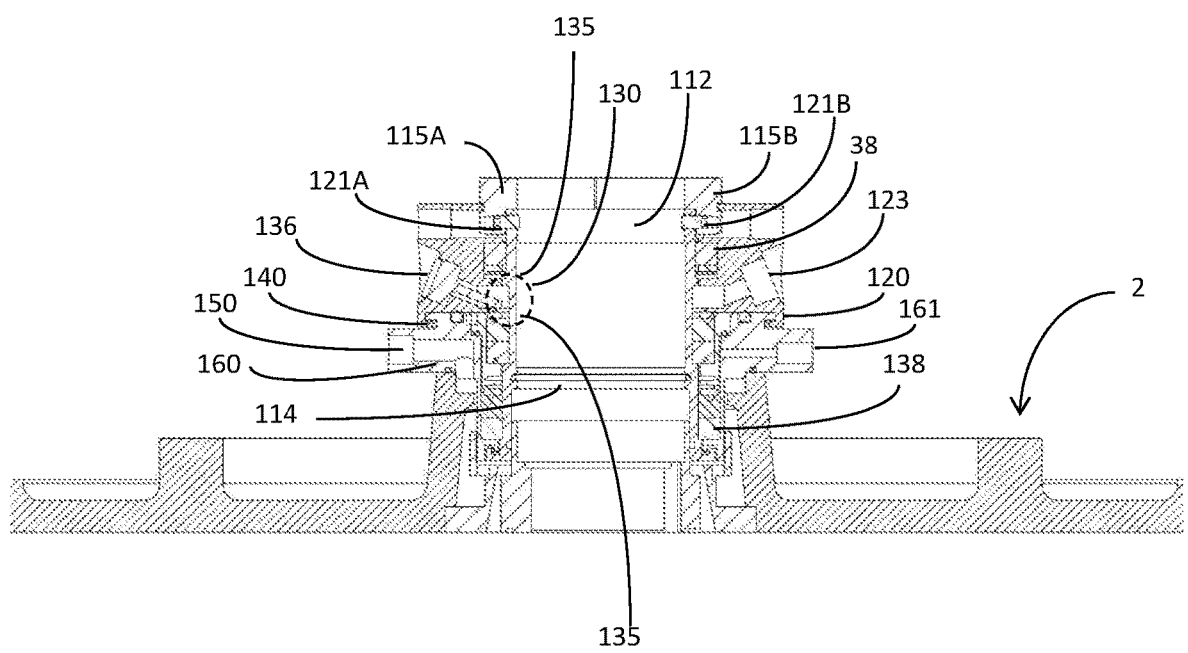
FIG. 6 is a section through the embodiment of FIG. 4.
Figure 7:
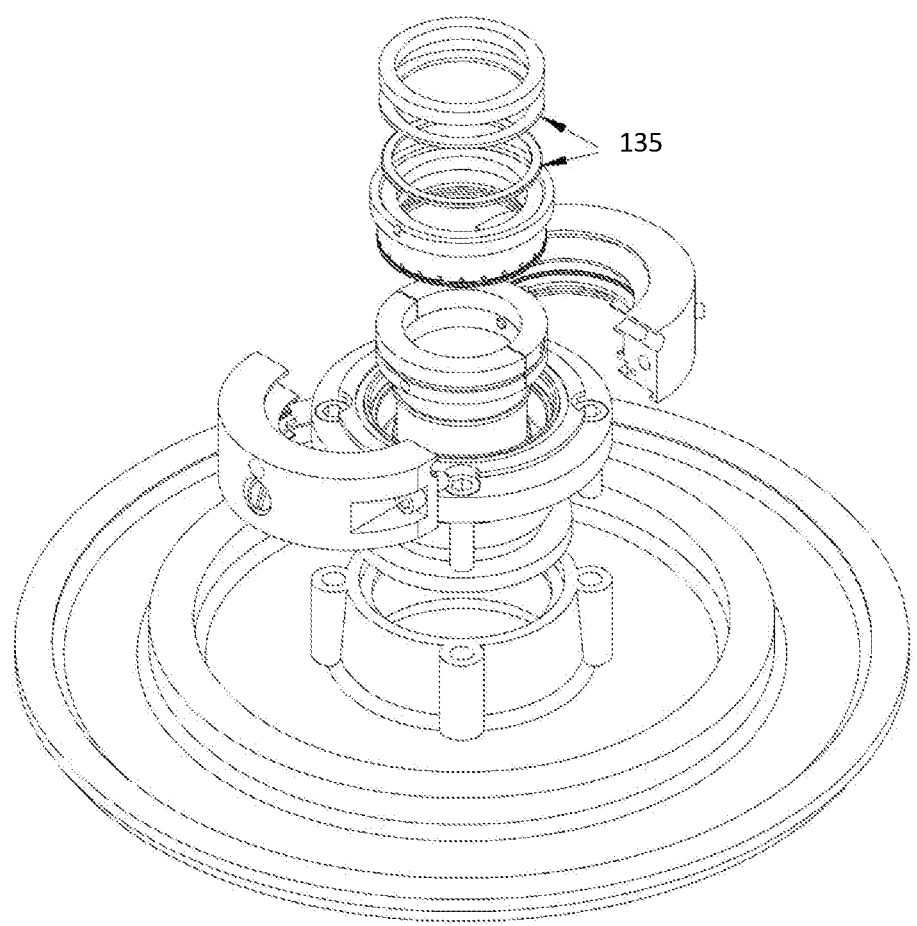
FIG. 7 is an exploded view of an embodiment similar to that of FIGS. 5 and 6, showing how a split gland can be pulled apart.

With reference to FIGS. 5 and 6, in a second embodiment 110, the gland is split between a distal gland 120 for a mechanical seal with non-Newtonian fluid seal from a cartridge injector and a comprises two parts—a proximal gland 160 for a Newtonian fluid seal, typically an air seal.

A collar 115 fits into the distal end of the stuffing box of the distal gland 120, and is screwed to a sleeve 112 that engages the drive shaft (not shown) by screws 121A, 121B. The mechanical seal 130 is provided between the sleeve 112 and an external female ring, which may be held in place by a screw 123. The non-Newtonian sealant is introduced by a port 136 and may be provided in a pressure cartridge.

Although not shown, the stuffing box may be divided into two by a stuffing box casing, to provide a water cooling jacket. However, as the working fluid is kept totally separate from the mechanical distal seal, and such pumps are typically used for pumping slurries and do not work at high pressures, water cooling is rarely needed.

The proximal gland 160 is separated from the sleeve 112 by a stuffing box which contains a packing seal 138. Two such seals are shown. A stuffing box jacket 140 is inserted thereover, and this creates a stuffing box for the distal mechanical seal, and packing seals 138 are inserted thereinto.

Once again, washers 135 may be provided to distribute the pressure of the non-Newtonian fluid sealant over the packing seals 138 more effectively, thereby enabling safe pumping of working fluids at higher pressures than hitherto achievable.

It will be appreciated that there is a small gap between the distal packing seals 138 and the stuffing box jacket 140. Air or another fluid is injected through port 150 and provides an air bubble at a slightly higher pressure than the working fluid. This air bubble fully separates the working fluid from the distal mechanical seal 130.

With general reference to FIG. 6, in a preferred embodiment, as shown, the collar 115, and distal gland 120 are each provided in two close fitting halves 115A, 115B, 120A, 120B, thereby enabling the mechanical distal section to be opened and disassembled for maintenance without removing the sealing unit 110 from the drive shaft.

If the sleeve 112 and the proximal gland 160 are also provided in two halves, the sealing system of the invention can be retrofitted to a drive shaft protruding from a housing 2 without dismantling. Such half elements are very carefully machined so that when the unit is assembled, the join between the half elements is virtually invisible.

It has been found useful that if only the collar 115 is provided as a split ring, it can be removed to enable access to the inside of the sealing unit 110 for maintenance purposes, such as replacement of packing seals, etc. without needing to dismantle the machine. Thus maintenance can be scheduled with downtimes, and minimally inconvenience the working of the machine.

Thus persons skilled in the art will appreciate that the present invention is not limited to what has been particularly shown and described hereinabove. Rather the scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. A sealing unit for a drive shaft driving a working fluid; sealing unit contained in a housing and comprising: a Sleeve attached to the drive shaft and a gland attached to the housing, a static seal ring attached to the gland and in close proximity to the sleeve, and a stuffing box about the static seal ring, fibrous packing seal blocking the distal and proximal ends of the stuffing box and a first sealant comprising a viscous, non-Newtonian fluid that is injected into the stuffing box under a first pressure exceeding the pressure of the working fluid; the sealing unit further comprising an inner fluid seal of a Newtonian fluid between the first sealant and the working fluid upstream of the first sealant, the Newtonian fluid seal being kept at a pressure slightly higher than the pressure of the working fluid and prevents the working fluid from reaching the first sealant.

2. The sealing unit of claim 1 wherein the first sealant is introduced into the stuffing box by a pressure injector thereby ensuring that the pressure thereof is above that of the pressure of the working fluid.

3. The sealing unit of claim 2 wherein the injection of the first sealant is asymmetric to the drive shaft.

4. The sealing unit of claim 2 further comprising washers between the packing seals and the viscous sealant to better transmit pressure of the viscous sealant more evenly around the drive shaft.

5. The sealing unit of claim 4 wherein the washers are provided with through holes or peripheral cut outs to enable wetting of the packing seal by the first sealant.

6. The sealing unit of claim 1 further comprises an external jacket around the stuffing box of the first sealant separated from the stuffing box by a space and water is injected into the space to cool the stuffing box and the first sealant therein.

7. The sealing unit of claim 6 wherein the jacket has baffles alternately extending from upstream and downstream edges to cause the water to flow in a lengthened undulating path.

8. The sealing unit of claim 1 wherein the packing seal comprises O rings, rope seals or braided packing seals.

9. The sealing unit of claim 1 wherein the Newtonian fluid providing the inner seal upstream of the stuffing box is a gas.

10. The sealing unit of claim 9 wherein the Newtonian is air.

11. The sealing unit of claim 9 wherein the Newtonian comprises inert gases selected from the group of nitrogen and noble gases.

12. The sealing unit of claim 1 wherein the Newtonian fluid is kept at a pressure slightly higher than the working fluid to prevent leakage of the working fluid into the sealing unit.

13. The sealing unit of claim 1 further comprising a proximal housing and a distal ring lid that closes the housing downstream of the stuffing box, wherein the distal ring lid is a split ring comprising two hemi-cylindrical sections that may be disconnected from the proximal housing and pulled apart to allow access to the housing without dismantling the housing from the drive shaft.

14. The sealing unit of claim 1 wherein all cylindrical parts comprise pairs of elements with hemi-cylindrical inner surfaces that are coupled together about the drive shaft, the sealing unit may be attached to a drive shaft in situ without threading onto the drive shaft.

* * * * *